Dec. 12, 1950  E. H. BRANDENBURG  2,533,348
PERMANENT MAGNET CHUCK
Filed March 29, 1948  2 Sheets-Sheet 1

INVENTOR.
Edwin H. Brandenburg
BY Harry R. Canfield
ATTORNEY

Dec. 12, 1950     E. H. BRANDENBURG     2,533,348
PERMANENT MAGNET CHUCK
Filed March 29, 1948     2 Sheets-Sheet 2
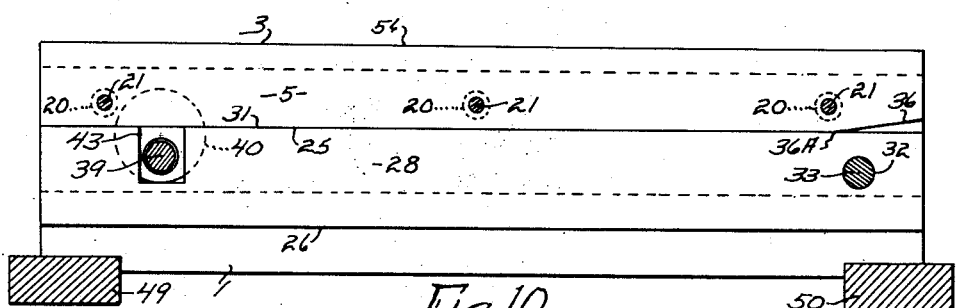
Fig. 10
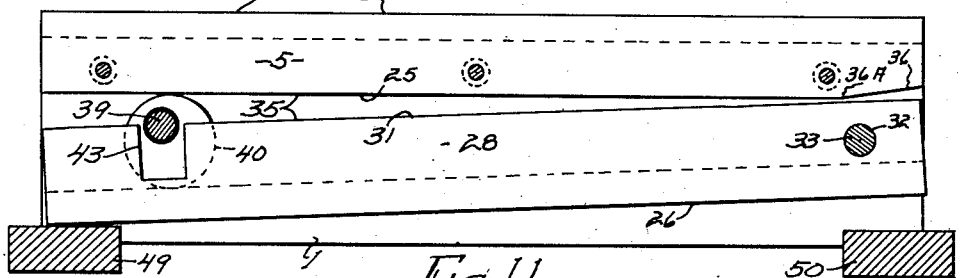
Fig. 11
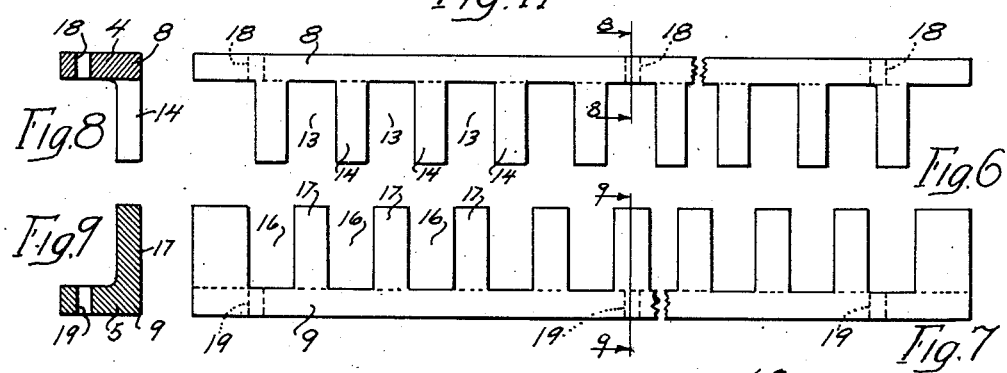
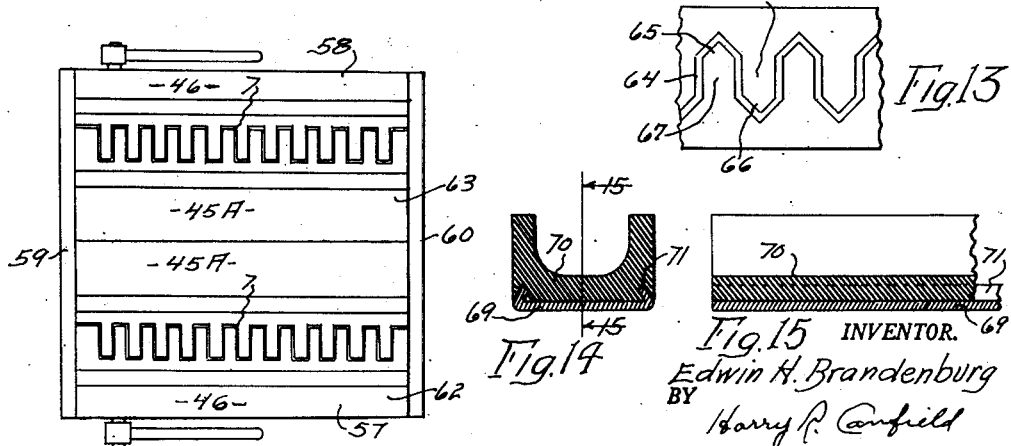
INVENTOR.
Edwin H. Brandenburg
BY Harry P. Canfield
ATTORNEY Patented Dec. 12, 1950

2,533,348

UNITED STATES PATENT OFFICE 2,533,348

PERMANENT MAGNET CHUCK

Edwin H. Brandenburg, Lakewood, Ohio

Application March 29, 1948, Serial No. 17,767

8 Claims. (Cl. 175—367)

This invention relates to magnetic work-holders of the so-called magnetic chuck class, and particularly to magnetic chucks of the permanent mganet type.

Magnetic work holding chucks have been proposed for machine tools such for example as surface grinders, comprising a flat or planar work supporting surface for supporting work pieces of ferrous or magnetically permeable material; and a plurality of permanent magnets so disposed that the work piece is in the path of the flux flowing between the poles of the magnets and is thereby magnetically attracted toward and frictionally engaged with or gripped with the work surface.

In all such chucks, utilizing permanent magnets, some operable means has to be provided to make the magnet "let go," or release the work piece, so it can be removed or replaced by another or adjustably positioned on the work surface relative to the working tool. The provision of such releasing means in magnet chucks heretofore has resulted in unduly great complications and production cost.

Again, in order that the chuck may have a relatively large total gripping area, at its work-supporting surface, prior chucks have utilized a multiplicity of permanent magnets each with its own local magnetic circuit effective on a fraction of the tool area; and this has not only of itself resulted in excessive complications and cost but has made the magnet-releasing features of construction correspondingly more complicated and costly.

Again, in prior magnetic chucks, the resistance to slipping of a work piece on the work supporting surface, has been less in one direction than in another direction, because of the unequalized distribution of the friction-producing flux, resulting from the shape, number, and arrangement of the several separate magnets utilized; so that the magnets have had to be larger and develop more powerful attractive force to satisfy the minimum anti-slip requirement, than would otherwise be necessary; and such chucks have accordingly had to be unduly large, heavy, and costly.

The foregoing are some of the deficiencies and disadvantages of prior permanent-magnet chucks; and it is an object of this invention to provide a chuck in which they are obviated.

Another object is to provide an improved construction of magnet for a permanent-magnet chuck.

Another object is to provide a permanent-magnet chuck having improved operative means for releasing the held work piece from the gripping action of the magnet.

Another object is to provide a permanent-magnet unit construction, having a size or area of work supporting and gripping surface suitable for many ordinary applications, and which can be assembled in duplicate, triplicate, etc. to provide a larger surface when that is wanted.

Another object is to provide an improved construction of magnetic pole piece for the magnet of a magnetic chuck.

Another object is to provide an improved magnetic circuit for a magnetic chuck, including a permanent magnet, a magnetic pole piece, and a work gap in the pole piece.

With these objects in view, and others which will appear hereinafter to those skilled in this art, the preferred embodiment of the invention comprises generally speaking: an elongated channel-form permanent magnet, and an elongated channel form pole piece, magnetically engageable and disengageable at confronting edge portions, of their respective channel flanges; and a flux work-gap in the channel web of the pole piece; and operable means to engage and disengage the magnet and pole piece; but while the construction embodying the invention in its preferred form may be thus briefly described, the invention itself is to be found in the appended claims.

The preferred embodiment of the invention is fully disclosed in the following description taken in connection with the accompanying drawing, in which.

Figure 1:
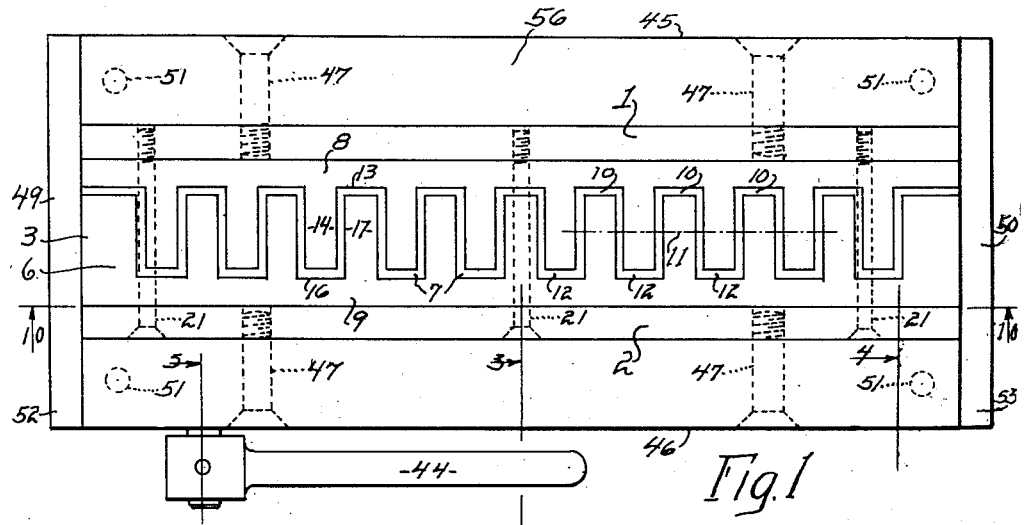
Fig. 1 is a top plan view of the embodiment.
Figure 2:
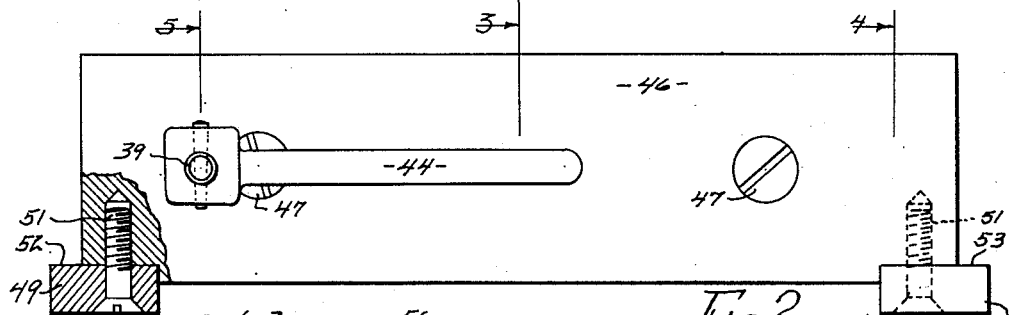
Fig. 2 is a side elevational view of the embodiment.
Figures 4, 5:
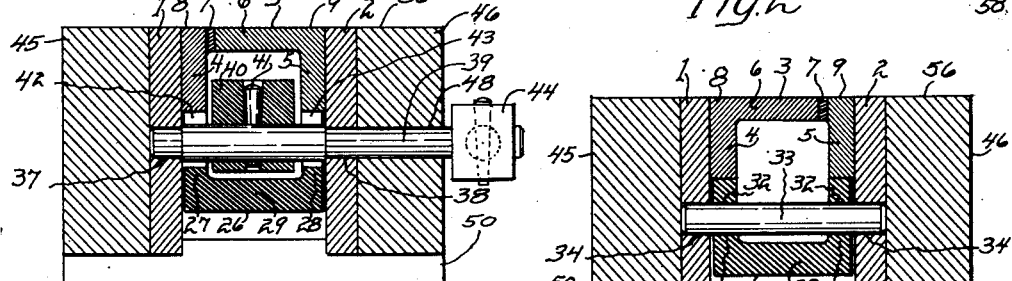
Figure 3:
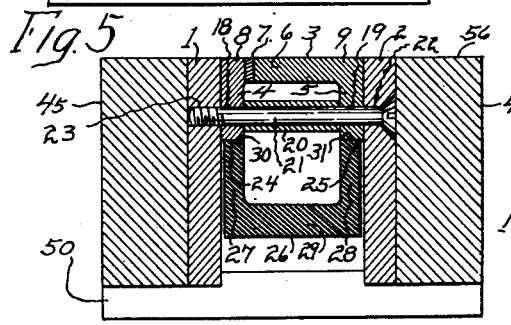

Figs. 3, 4, and 5 are sectional views taken respectively from the planes 3—3, 4—4, and 5—5 of Fig. 2; or of Fig. 1;

Figs. 6 and 7 are views illustrating two parts of an element of the preceding figures in process of being made;

Figs. 8 and 9 are respectively sectional views from the planes 8—8 of Fig. 6 and 9—9 of Fig. 7;

Fig. 10 is a longitudinal sectional view approximately from the plane 10 of Fig. 1;

Fig. 11 is a view similar to Fig. 10 but with movable parts thereof in different positions;

Fig. 12 is a view similar to Fig. 1 illustrating a modification;

Fig. 13 is a fragmentary view similar to a part of Fig. 1 illustrating a modification;

Fig. 14 is a cross-sectional view of a magnet utilized in the embodiment of the invention but with a modification of the structure applied thereto;

Fig. 15 is a longitudinal sectional view of a part of the magnet of Fig. 14 from the plane 15—15 of Fig. 14;

Referring to the drawing, there is shown generally in Figs. 1 and 2, a chuck embodying the invention and for clarity and simplification of description the original drawing has been made to life size scale, of a practical device of average capacity. In general the chuck is of elongated rectangular shape both in plan as in Fig. 1 and in side elevation as in Fig. 2.

At 1—2 are two rectangular bars of non-magnetic metal, for example brass, extending the length of the device, and spaced apart and parallel.

Disposed between the bars 1—2 is a longitudinally extending steel channel 3 comprising flanges 4—5 depending vertically from an intermediate horizontal web 6.

The channel web 6 has a magnetic flux work gap 7 (to be described) extending through it and longitudinally from end to end so that the channel 3 actually comprises two parts 8—9 from which it is made. It is for convenience of description that it is considered herein as a whole and as a channel.

The work gap 7 is preferably of rectangular wave form as shown best in Fig. 1; that is to say, it comprises longitudinally spaced U-shaped rectangular loop portions 10—10—10 at one side of a medial line 11 alternating with and continuous with U-shaped rectangular loop portions 12—12—12 on the other side of the medial line.

The preferred procedure to make the channel 6 from the said two parts 8—9 and to provide the wave form work gap 7 in it, is as follows.

The part 8 (see Figs. 6 and 8) is a length of angle section steel, and has notches or recesses 13—13—13 cut or punched out of one flange leaving that flange in the form of spaced tongues 14—14—14.

The other part 9 (see Figs. 7 and 9) is, similarly, a length of angle section steel with recesses 16—16—16 cut or punched in one flange, leaving tongues 17—17—17.

The recesses 13 and 16 are wider and deeper than the width and length of the tongues 14 and 17, respectively.

A series of holes 18—18 are provided in the other flange 4 of the part 8; and a like series of holes 19—19 in the other flange 5 of the part 9.

A sub-assembly is now made of the parts 8—9 and the bars 1—2, this sub-assembly being shown as a part of the complete assembly of Fig. 3. To this end, the tongues 17 and 14 and the recesses 13 and 16 are intermeshed with each other, as shown in Fig. 1; with the said other flanges 4 and 5 opposite to each other as in Fig. 3, which, as will be understood, provides the illustrated rectangular wave form gap 7; and the holes 18—19 in the respective flanges 4—5 are so located that they will at this time come into axial alignment.

Tubular spacers 20—20 of non-magnetic metal, for example bronze, are placed between the flanges 4—5 abutting thereon and each axially aligned with a pair of holes 18—19. Bolts 21—21 of non-magnetic metal, for example bronze, are projected through holes 22 in the bar 2, axially aligned with the holes 19, and through the holes 19, through the spacers 20, and through the holes 18, and are screwed into threaded holes 23 provided in the bar 1; and when the bolts are drawn up tight, the two parts 8 and 9 composing the channel 3, are rigidly clamped and assembled between the bars 1—2 with the wave form gap 7 therebetween; the flanges 4—5 being held apart by the spacers 20 and the parts of the channel web 6 being held in a common plane by the bolts 21 and aligned holes 18—19.

It is preferable at this time to fill the work gap 7 with solid non-magnetic material; and for this purpose, I prefer to employ a material which may be tamped into the gap 7 in a plastic condition and which will thereafter set and harden and have generally the characteristics of metal; and such material being well known, and not of itself constituting a part of the invention, need not be further specified or described.

Before assembling the parts 8 and 9 with the bars 1—2 as described the lower edges 24—25 of their depending flanges 4—5 are preferably machined or ground so that when assembled as described they will be in a common plane.

The permanent magnet of the chuck is shown at 26. It is of channel form, extending longitudinally of the device under the steel channel 3 comprising channel flanges 27—28 projecting upwardly from a web 29. It is of U-form in cross-section and is magnetized like a U-shaped magnet, that is, the flanges 27—28 are the opposite polarity magnet poles.

The upper edges 30—31 of the flanges 27—28 confront the lower edges 24—25 of the steel channel; and an external magnetic circuit is thus provided for the magnet, comprising the steel channel flanges 4—5 and web 6 and gap 7. The parts 8—9 of the steel channel 3 are properly designated as pole pieces for the magnet.

The edges 30—31 of the magnet are preferably ground to a common plane so that they can make low reluctance magnetic contact with the planar edges 24—25 of the steel channel.

The channel form magnet is hinged at one end to the bars 1—2 as shown in Figs. 4, 10, and 11. The magnet is preferably formed as a casting from magnet alloy which as is well known is too hard for drilling, and accordingly, a pair of aligned bearing holes 32—32 are cored in the flanges 27—28 and later ground out to required diameter to provide a rotating fit on a hinge pin 33 of non-magnetic metal, such as bronze, projecting therethrough. The pin ends are seated in aligned holes or bores 34—34 provided in the bars 1—2, near one end thereof.

The magnet flanges 27—28 will at all times be attracted toward the steel channel flanges 4—5; and may be in direct contact with them as in Fig. 10 (also Figs. 3 and 4) and in that position the reluctance of the magnetic circuit will be at the minimum and the working flux at the gap 7 will be at the maximum for the intended uses to be described. The magnet may be hingingly rocked downwardly around the pin 33 to the position of Fig. 11, separating the engaged flange edges and introducing a large air gap 35 therebetween, and thereby weakening the working flux at the work gap 7 for operative purposes.

The extreme end portions of the steel flange edges 24—25 may be cut away as shown at 36 (for the edge 24 in Figs. 10 and 11) to give clearance for that part of the magnet flanges outwardly beyond the pintle pin 33. The cut away portion 36 preferably begins at a point 36A inwardly of the pin 33 so that when the magnet moves downwardly to introduce the gap 35, Fig. 11, the gap 35 will extend from one extreme end to the other of the magnet and all parts of the magnet edges 30—31 will be spaced by the gap 35 from the edges 24—25 of the steel channel.

For convenience in rocking the magnet downwardly as referred to a manual device is provided; and is preferably of a force multiplying type, because, when the said pairs of edges 24—30 and 25—31 are ground planar edges as referred to, they will come into very intimate contact; and the attractive force therebetween will be very great; and to break this contact engagement great force may be needed. This device will now be described.

A pair of axially aligned bearing bores 37—38 are provided in the bars 1—2 near their ends opposite the hinge pin 33; and a cam shaft 39 is rotatably mounted therein. An eccentric cam 40 is mounted on the cam shaft, and disposed between the flanges 27—28 of the magnet, and secured on the cam shaft by a pin 41. The cam shaft 39, and preferably also the cam 40, are made from non-magnetic metal.

The cam shaft passes through the magnet flanges 27—28 in upwardly open notches 42—43 provided in the flanges, the notches embracing the cam shaft with clearance, to allow free hinging movement of the magnet.

The eccentric periphery of the cam 40 engages the inner side of the magnet channel web 29 as a cam follower. Upon rotation of the cam shaft 39 in either direction the cam 40 forces the magnet downwardly as referred to.

The cam shaft has a handle 44 pinned to it for rotating it.

To add to the overall width and stability of the chuck and to provide means for securing it to a machine work table, steel frame bars 45—46 are secured to the respective bars 1—2 by screws 47—47 projected through holes in the frame bars and screwed into threaded holes in the bars 1—2.

The frame bar 46 is provided with a hole 48 through which the outer end of the cam shaft 39 extends. The frame bars 45—46, as shown in Fig. 4, overlap the ends of the pin 33 and trap it in place.

Feet 49—50 are provided under the ends of the bars 1—2 and frame bars 45—46, and are secured to the frame bars 45—46 by screws 51—51. The feet extend beyond the ends of the device as at 52—53, and these exposed parts of the feet are adapted to be fastened down upon the machine work table by the usual means to mount the device thereon.

The upper surfaces of the frame bars 45—46, the brass bars 1—2, the steel channel web 6, and the non-magnetic filling material in the gap 7, are all ground to a common plane to provide generally the work supporting surface 56 as referred to.

It is believed to be apparent that, in the operation of the device, strong magnetic flux from the permanent magnet 26 flows across the magnetic gap 7, when the cam 40 has been rotated by the handle 44 to allow the magnet to be attracted upwardly and to close the gap 35 of Fig. 11. Work pieces laid on the work supporting surface 56 and covering any part of the work gap 7 will be drawn by the flux into gripping engagement with the work supporting surface; and will be released upon weakening the flux in the gap 7 upon forcing the magnet 26 downwardly by the cam operating handle 44.

It will be observed that in thus breaking the grip of the magnet, it is done by a rocking movement of the magnet, first introducing a gap at one end of the magnet, opposite the hinge end. Flux across this gap then tends to move over and concentrate in the parts of the gap nearer the hinge end, where its attractive force is of decreasing effectiveness. Thus less force is needed to pull the magnet away by such arcuate rocking movement than would be necessary if the magnet were moved away rectilinearly with a gap of uniform width from end to end.

Because of the wave form of the flux gap 7, the gap occupies a large part of the surface 56 and presents a large area for gripping work pieces, and all parts of the gap are nevertheless supplied with flux, by the very simple magnet and magnetic circuit hereinbefore described. Again, and as will be apparent in Fig. 1, a part of the gap extends in the longitudinal direction of the work surface 56; and a part extends transversely thereof; and since the resistance to slipping of a work piece on the surface 56 in the linear direction of the gap is different from that transversely of the gap, the wave form gap by providing both longitudinal and transverse gap portions provides the maximum anti-slipping action for the minimum of flux and minimum size of magnet.

The unit chuck, as of Figs. 1 and 2, has been developed for work pieces of ordinary or average size, and will suffice for most applications. When larger sizes are wanted, I prefer to use two or more of these same units assembled together in a single structure. In Fig. 12, is shown a chuck comprising two such units at 57 and 58. To produce this chuck the only additional part needed is a pair of longer transverse feet. Instead of the feet 49—50 long enough for one unit as in Figs. 1 and 2, feet 59—60 are provided secured to both units 57 and 58. After the units 57—58 are secured to the feet 59—60, the top surfaces 62—63 of both units 57—58 may be ground off to a single plane to provide a work supporting surface. Work pieces large enough to overlap the wave form gaps 7—7 of both units may then be gripped to this common surface.

If it be desired to space the two air gaps 7—7 some specified distance apart greater or smaller than that effected by the width of the frame elements 45—45 shown in the form of Fig. 1 as might be dictated by a work piece of predetermined size, this may be done by making the adjacent elements 45—45 of corresponding special thickness as shown for example in Fig. 12 for frame elements 45A—45— of greater thickness.

In Fig. 13 at 64 is illustrated a modified form of the wave form working flux gap, resulting from a different shape for the recesses, here 65—66, and for the tongues, here 67—68. The tongues are pointed at their ends as shown and the recesses having correspondingly shaped bottoms.

In some cases, it may be found desirable to strengthen the brittle cast alloy composing the permanent magnet by a steel reinforcement. One form for such reinforcement is shown in Figs. 14 and 15. It comprises a shallow channel 69 of steel extending along the lower side of the magnet channel web 70 and having re-entrant side flanges 71 embedded in the cast metal of the magnet.

In the above described embodiment of the invention, the work supporting surface 56 is shown and described as planar, because such a surface will grip a large variety of work pieces of different forms. In such cases, the chuck may be considered as a part of the machine on which it is mounted.

It will be apparent however that this work supporting surface may be shaped to be concave or convex, etc. and to conform to the contours of the piece to be gripped, and therefore firmly grip work pieces of such form that they cannot be firmly gripped by the planar work surface of the conventional chuck.

In other words, the construction of the chuck is so simple that an individual chuck can economically be made and its work surface contoured especially for only one particular manufactured part to hold it while being operated on in quantity production; and therefore the chuck may be considered in such cases as in the class of jigs and fixtures rather than as a work holder for general use.

My invention is not limited in its scope to the exact details of the embodiment thereof illustrated and described herein; but is comprehensive of all changes and modifications which come within the scope of the appended claims.

I claim:

1. In a magnetic chuck, a rigid frame comprising a pair of elongated parallel spaced apart steel frame elements; a pair of elongated parallel spaced-apart non-magnetic bars secured by screws to the inner adjacent sides of the frame elements; and a downwardly open steel channel structure clamped between the inner adjacent sides of the bars by bolts projected through the bars and channel flanges; a work supporting planar surface provided jointly on upper surface of the steel channel structure, the bars, and the frame elements; the channel web of the channel structure provided with a longitudinally extending magnetic flux gap therethrough and open at said surface; an elongated permanent magnet of upwardly open channel form, the channel flanges of which constitute opposite-polarity magnet poles, disposed between the non-magnetic bars, and hinged at one end portion to the frame by a hinge pintle on the frame extending through the magnetic channel flanges; the magnet being hingingly movable in one direction to dispose its longitudinal flange edges in magnetic contact with the longitudinal flange edges of the steel channel structure; and in the other direction to break said magnetic contact and introduce a tapering air gap of less width at the hinged end of the magnet than at the other end; and manually operable force multiplying means reacting on the frame and on the magnet to move the magnet to break said magnetic contact.

2. In a magnetic chuck, a rigid frame comprising a pair of elongated parallel spaced apart steel frame elements; a pair of elongated parallel spaced-apart non-magnetic bars secured by screws to the inner adjacent sides of the frame elements; and a downwardly open steel channel structure clamped between the inner adjacent sides of the bars by bolts projected through the bars and channel flanges; a work supporting planar surface provided jointly on upper surface of the steel channel structure, the bars, and the frame elements; the channel web of the channel structure provided with a longitudinally extending magnetic flux gap therethrough and open at said surface; an elongated permanent magnet of upwardly open channel form, the channel flanges of which constitute opposite-polarity magnet poles, disposed between the non-magnetic bars, and hinged at one end portion to the frame by a hinge pintle on the frame extending through the magnet channel flanges; the magnet being hingingly movable in one direction to dispose its longitudinal flange edges in magnetic contact with the longitudinal flange edges of the steel channel structure; and in the other direction to break said magnetic contact and introduce a tapering air gap of less width at the hinged end of the magnet than at the other end; and manually operable means to forcibly move the magnet to break said magnetic contact comprising: a cam shaft rotatably supported on the frame; a rotary eccentric cam disposed between the magnet channel flanges, and rotatable by the shaft into wedging engagement with the magnet channel, and a handle on the cam shaft outside of the frame to rotate the shaft.

3. A magnetic work holding chuck comprising a pair of rectilinear elongated side bars of non-magnetic material having longitudinally elongated mutually confronting faces substantially equally spaced apart from end to end and generally vertical in the position of use of the chuck; a pair of rectilinear elongated pole pieces of magnetically permeable material between the said confronting faces, substantially coextensive longitudinally with the side bars; each pole piece comprising two flanges, one flange of each pole piece being generally horizontal; the other flanges extending downwardly and being secured respectively to the side bars and the respective lower edges of the downwardly extending flanges being planar and extending along the side bar faces, and the generally horizontal flanges extending generally toward each other with their edges adjacent but with a gap therebetween and formed externally to provide, jointly, a work supporting surface in a common plane; a longitudinally rectilinear elongated permanent magnet, channel form in cross section, providing transversely spaced upwardly extending flanges, the edges of the magnet flanges being planar and substantially coextensive with the said planar edges of the pole pieces; the magnet being magnetized so that the edges of its flanges are of opposite polarity, and each edge of the same polarity from end to end; the magnet being disposed between the faces of the side bars, with the planar edges of the magnet flanges normally in intimate magnetic contact with the said planar edges of the flanges of the pole pieces; the magnet supplying magnetic flux to the pole pieces in parallel planes transversely of the pole pieces and magnet, from end to end thereof; the magnet being hingingly supported adjacent to one end thereof upon a hinge pin extending between the side bars whereby the magnet may be hingingly moved downwardly about the hinge axis upon breaking said magnetic contact and introduce an air gap of increasing width from the hinged end of the magnet to its other end; and manually operable force magnifying means to break said intimate magnetic contact.

4. A magnetic work holding chuck comprising a pair of rectilinear elongated side bars of non-magnetic material having longitudinally elongated mutually confronting faces substantially equally spaced apart from end to end and generally vertical in the position of use of the chuck; a pair of rectilinear elongated pole pieces of magnetically permeable material between the said confronting faces, substantially coextensive longitudinally with the side bars; each pole piece comprising two flanges, one flange of each pole piece being generally horizontal; the other flanges extending downwardly and being secured respectively to the side bars and the respective lower edges of the downwardly extending flanges being planar and extending along the side bar faces, and the generally horizontal flanges extending generally toward each other with their edges adjacent but with a gap therebetween and formed externally to provide, jointly, a work supporting surface in a common plane; a longitudinally rectilinear elongated permanent magnet, channel form in cross section, providing transversely spaced upwardly extending flanges, the edges of the magnet flanges being planar and substantially coextensive with the said planar edges of the pole pieces; the magnet being magnetized so that the edges of its flanges are of opposite polarity, and each edge of the same polarity from end to end; the magnet being disposed between the faces of the side bars, with the planar edges of the magnet flanges normally in intimate magnetic contact with the said planar edges of the flanges of the pole pieces; the magnet supplying magnetic flux to the pole pieces in parallel planes transversely of the pole pieces and magnet, from end to end thereof; the magnet being hingingly supported adjacent to one end thereof upon a hinge pin extending between the side bars whereby the magnet may be hingingly moved downwardly about the hinge axis upon breaking said magnetic contact and introduce an air gap of increasing width from the hinged end of the magnet to its other end; and manually operable force magnifying means to break said intimate magnetic contact; comprising a rotatably supported shaft bridging the side bars and an eccentric cam on the shaft between the side bars, the cam disposed to exert a downward camming force on a portion of the magnet adjacent to its end opposite its hinged end, when the shaft is rotated; and a handle for rotating the shaft.

5. A magnetic work holding chuck comprising a pair of rectilinear elongated side bars of nonmagnetic material having longitudinally elongated mutually confronting faces substantially equally spaced apart from end to end and generally vertical in the position of use of the chuck; a pair of rectilinear elongated pole pieces of magnetically permeable material between the said confronting faces, substantially coextensive longitudinally with the side bars; each pole piece comprising two flanges, one flange of each pole piece being generally horizontal; the other flanges extending downwardly; securing means securing the pole pieces and side bars together in a rigid unit; and the respective lower edges of the downwardly extending flanges being planar and extending along the side bar faces, and the generally horizontal flanges extending generally toward each other with their edges adjacent but with a gap therebetween and formed externally to provide, jointly, a work supporting surface in a common plane; a longitudinally rectilinear elongated permanent magnet, channel form in cross section, providing transversely spaced upwardly extending flanges, the edges of the magnet flanges being planar and substantially coextensive with the said planar edges of the pole pieces; the magnet being magnetized so that the edges of its flanges are of opposite polarity, and each edge of the same polarity from end to end; the magnet being disposed between the faces of the side bars, with the planar edges of the magnet flanges normally in intimate magnetic contact with the said planar edges of the flanges of the pole pieces; the magnet supplying magnetic flux to the pole pieces in parallel planes transversely of the pole pieces and magnet, from end to end thereof; the magnet being hingingly supported adjacent to one end thereof upon a hinge pin extending between the side bars whereby the magnet may be hingingly moved downwardly about the hinge axis upon breaking said magnetic contact and introduce an air gap of increasing width from the hinged end of the magnet to its other end; and manually operable force magnifying means to break said intimate magnetic contact.

6. A magnetic work holding chuck comprising a pair of rectilinear elongated side bars of nonmagnetic material having longitudinally elongated mutually confronting faces substantially equally spaced apart from end to end and generally vertical in the position of use of the chuck; a pair of rectilinear elongated pole pieces of magnetically permeable material between the said confronting faces, substantially coextensive longitudinally with the side bars; each pole piece comprising two flanges, one flange of each pole piece being generally horizontal; the other flanges extending downwardly; securing means securing the pole pieces and side bars together in a rigid unit; comprising clamping bolts projected through the side bars and through the downwardly extending pole piece flanges and spacer means holding the flanges apart; and the respective lower edges of the downwardly extending flanges being planar and extending along the side bar faces, and the generally horizontal flanges extending generally toward each other with their edges adjacent but with a gap therebetween and formed externally to provide, jointly, a work supporting surface in a common plane; a longitudinally rectilinear elongated permanent magnet, channel form in cross section, providing transversely spaced upwardly extending flanges, the edges of the magnet flanges being planar and substantially coextensive with the said planar edges of the pole pieces; the magnet being magnetized so that the edges of its flanges are of opposite polarity, and each edge of the same polarity from end to end; the magnet being disposed between the faces of the side bars, with the planar edges of the magnet flanges normally in intimate magnetic contact with the said planar edges of the flanges of the pole pieces; the magnet supplying magnetic flux to the pole pieces in parallel planes transversely of the pole pieces and magnet, from end to end thereof; the magnet being hingingly supported adjacent to one end thereof upon a hinge pin extending between the side bars whereby the magnet may be hingingly moved downwardly about the hinge axis upon breaking said magnetic contact and introduce an air gap of increasing width from the hinged end of the magnet to its other end; and manually operable force magnifying means to break said intimate magnetic contact.

7. A magnetic work holding chuck comprising a pair of rectilinear elongated side bars of nonmagnetic material having longitudinally elongated mutually confronting faces substantially equally spaced apart from end to end and generally vertical in the position of use of the chuck; a pair of rectilinear elongated pole pieces of magnetically permeable material between the said confronting faces, substantially coextensive longitudinally with the side bars; each pole piece comprising two flanges, one flange of each pole piece being generally horizontal; the other flanges extending downwardly and being secured respectively to the side bars and the respective lower edges of the downwardly extending flanges being planar and extending along the side bar faces, and the generally horizontal flanges extending generally toward each other with their edges adjacent but with a gap therebetween and formed externally to provide, jointly, a work supporting surface in a common plane, a longitudinally rectilinear elongated permanent magnet, channel form in cross section, providing transversely spaced upwardly extending flanges, the edges of the magnet flanges being planar and substantially coextensive with the said planar edges of the pole pieces; the magnet being magnetized so that the edges of its flanges are of opposite polarity, and each edge of the same polarity from end to end; the magnet being disposed between the faces of the side bars, with the planar edges of the magnet flanges normally in intimate magnetic contact with the said planar edges of the flanges of the pole pieces; the magnet supplying magnetic flux to the pole pieces in parallel planes transversely of the pole pieces and magnet, from end to end thereof; the magnet being hingingly supported adjacent to one end thereof upon a hinge pin extending between the side bars whereby the magnet may be hingingly moved downwardly about the hinge axis upon breaking said magnetic contact and introduce an air gap of increasing width from the hinged end of the magnet to its other end; a pair of outer frame elements at laterally opposite sides of the side bars; securing means securing the frame elements and side bars together; feet under and connected to the frame elements; the frame elements having a common work supporting surface in the plane of the work supporting surface of the pole pieces; and manually operable force magnifying means to break said intimate magnetic contact comprising a rotatably supported shaft extending through an outer frame element and bridging the side bars and an eccentric cam on the shaft between the side bars, the cam disposed to exert a downward camming force on a portion of the magnet adjacent to its end opposite its hinged end, when the shaft is rotated; and a handle for rotating the shaft.

8. A magnetic work chuck comprising a pair of elongated rectilinear pole pieces of magnetically permeable material, each comprising flange portions generally horizontal in the position of use of the chuck; the flange portions extending toward each other and having edges adjacent but with a gap therebetween; and provided with uppermost work supporting surfaces in a common plane; the pole pieces having longitudinally extending downwardly facing planar portions substantially coextensive longitudinally with the pole pieces and spaced apart transversely; a longitudinally elongated permanent magnet, channel form in cross section, providing transversely spaced upwardly extending flanges, the edges of the magnet flanges being planar and substantially coextensive with the said planar edges of the pole pieces; the magnet being magnetized so that the edges of its flanges are of opposite polarity, and each edge of the same polarity from end to end; the magnet being disposed with the planar edges of the magnet flanges normally in intimate magnetic contact with the said planar edges of the flanges of the pole pieces; the magnet supplying magnetic flux to the pole pieces in parallel planes transversely of the pole pieces and magnet, from end to end thereof; the magnet being hingingly supported adjacent to one end thereof upon a hinge axis whereby the magnet may be hingingly moved downwardly about the hinge axis upon breaking said magnetic contact and introduce an air gap of increasing width from the hinged end of the magnet to its other end; and manually operable force magnifying means to break said intimate magnetic contact.

EDWIN H. BRANDENBURG.

REFERENCES CITED

The following references are of record in the file of this patent:

UNITED STATES PATENTS

| Number | Name | Date |
|---|---|---|
| 651,908 | Walker | June 19, 1900 |
| 2,179,625 | Groden | Nov. 14, 1939 |
| 2,203,512 | Wesemann | June 4, 1940 |
| 2,217,048 | Floss | Oct. 8, 1940 |
| 2,333,230 | Beechlyn | Nov. 2, 1943 |
| 2,426,795 | Sjostrom | Sept. 2, 1947 |

FOREIGN PATENTS

| Number | Country | Date |
|---|---|---|
| 450,541 | Great Britain | July 15, 1936 |

OTHER REFERENCES

G. E. Permanent Magnet Catalog, pages 9 and 15, No. CDM-2A (9-48-20M), G. E. Chemical Dept., Pittsfield, Mass.